United States Patent [19]
Reese

[11] 3,921,544
[45] Nov. 25, 1975

[54] METHOD AND APPARATUS FOR PARTICLE COLLECTION IN THE EXHAUST OF A FLUID BED DISPOSAL APPARATUS

[75] Inventor: Richard G. Reese, Woodside, Calif.

[73] Assignee: Combustion Power Company, Inc., Menlo Park, Calif.

[22] Filed: June 24, 1974

[21] Appl. No.: 482,618

Related U.S. Application Data

[63] Continuation-in-part of Ser. No. 247,829, April 26, 1972, Pat. No. 3,818,846.

[52] U.S. Cl. ............ 110/8 F; 55/345; 110/28 J; 110/119
[51] Int. Cl.² .................. F23G 7/00; B01D 45/12
[58] Field of Search............ 110/8 R, 8 F, 7 R, 28 J, 110/119; 55/345

[56] References Cited
UNITED STATES PATENTS

| | | |
|---|---|---|
| 2,802,280 | 8/1957 | Sylvest .......................... 110/119 X |
| 2,934,494 | 4/1960 | Kleiber .............................. 55/345 |
| 3,247,651 | 4/1966 | Hutchings ........................... 55/345 |
| 3,366,080 | 1/1968 | Albertson .......................... 110/8 |

Primary Examiner—Kenneth W. Sprague
Attorney, Agent, or Firm—Limbach, Limbach & Sutton

[57] ABSTRACT

Method and apparatus are disclosed for separating fluid bed granular particles and flyash which are entrained in the exhaust gases of a fluid bed reactor for return of the granular material to the fluid bed. The separation is accomplished in at least a two-stage inertial separation method and apparatus wherein the granular particles are separated in the first stage and flyash is separated from the exhaust gases in the second stage. Flyash separated from the exhaust gas with the granular particles can be separated from the granular particles and directed to residue storage. Heat exchange is disclosed between the exhausting combustion gases in the inertial separators and air being directed to the fluid bed for fluidization.

4 Claims, 3 Drawing Figures

METHOD AND APPARATUS FOR PARTICLE COLLECTION IN THE EXHAUST OF A FLUID BED DISPOSAL APPARATUS

This application is a continuation-in-part of my copending application Ser. No. 247,829 filed Apr. 26, 1972, now U.S. Pat. No. 3,818,846, issued June 25, 1974, the full disclosure of which is hereby incorporated herein by reference.

BACKGROUND OF THE INVENTION

Systems such as described in U.S. Pat. 3,589,313 to Smith et al. have been known for consuming solid waste in fluid bed reactors, and problems have existed in such systems for efficient operation thereof using high air flow and still avoiding loss of the particulate matter from the fluid bed and excessive contamination of the exhaust gases with flyash and other air pollutants.

The object of the present invention is to provide a novel method and apparatus for separating the granular fluid bed material and flyash entrained with exhaust gases from a fluid bed reactor for efficient operation and permissable operation under existing air pollution standards. The separated granular material is returned to the fluid bed.

In accordance with another aspect of the present invention, flyash which is separated from the exhaust gas stream with the granular material in the first stage of inertial separation is then separated from the granular material and carried to residue storage.

In accordance with still another aspect of the present invention, the first and second stage inertial separation is conducted in heat exchange with the combustion air that is being directed to fluidize the granular bed in the combustion chamber both to cool the inertial separation stages and to preheat the combustion air.

These and other features and advantages will become more apparent upon a perusal of the following specification taken in conjunction with the accompanying drawings wherein similar characters of reference refer to similar structures in each of the several views.

PREFERRED EMBODIMENT

While the present invention is well suited for the pollution-free disposal of solid waste with the possible additional simultaneous disposal of various liquid materials, one configuration of the invention is useful in a municipal solid waste disposal plant wherein the solid waste can be used as a fuel to dispose of high water content municipal sewage sludge from a given population segment. Accordingly, the invention will be described with reference to such a system.

Figure 1:
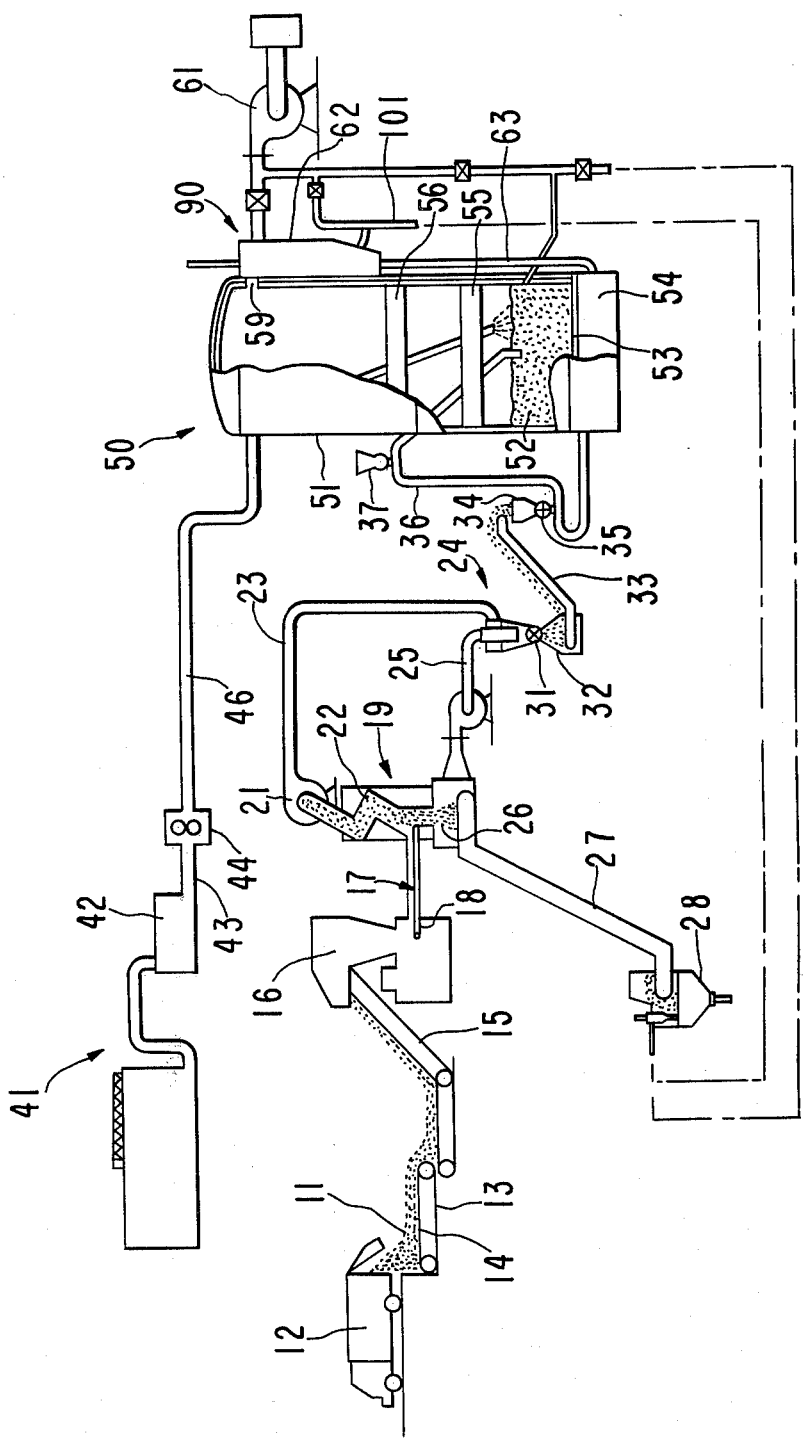
FIG. 1 is a side-elevational schematic view illustrating the present invention.

Referring now to the drawings with particular reference to FIG. 1, the combustion system includes three principal assemblies, first the waste delivery assembly 10 where solid waste material is collected, shredded and separated for introduction of the principal consumable portion into a combustion assembly, second the combustion assembly 50 wherein the solid waste is consumed and wherein the solid waste can also serve as a fuel to dispose of sewage sludge and third the combustion gas particle cleanup assembly 90 wherein entrained particles are removed from the combustion gases which are then either exhausted or conveyed on to perform work.

In the waste delivery system 10, solid waste 11 is received, typically in refuse or garbage collection trucks 12 which deliver the waste in either compacted or uncompacted form into a receiving pit 13 sized to act as a storage area so that the system can operate continuously while receiving solid waste only over a specified period of the day. From the pit 13 the waste 11 is delivered first by a pit conveyor 14 and then a shredder feed conveyor 15 into the top of a shredder 16 such as a belt-driven vertical, rotor, shredder grinder. The waste is gradually reduced in size and ejected into an exhaust chute 17 where it is conveyed with the aid of a conveyor 18 to an air classifier 19.

The effluent from the shredder 16 is a homogenoous mixture with particle size depending upon the shredder setting and the feed rate, varying from a very fine to 1 inch by 2 inches and larger. The steel and other ductile metal is in small balls with some coinage. Wood is toothpick to pencil size. The more flexible material, such as soft plastic and soft material such as rubber, are the largest particles.

High density, non-combustible particles coming out of the shredder 16 are removed from the process by the air classifier 19. This is done primarily to protect subsequent feed processes since the material removed has little heating value and hence would be little altered in volume or weight by the combustion process. Also, the air classifier provides a means for separating the reclaimable metal, glass, etc. for recycling to the appropriate industries for reuse if desired.

In the air classifier 19 a large blower 21 is used to such the refuse up through an inclined treacherous path 22 and out through a tube 23 to a velocity reducer/solid waste accumulator system in the form of a cyclone inertial separator 24. The exhaust stack 25 of the inertial separator 24 containing the major portion of the air used during the air classifying cycle returns this air to the lower inlet of the air classifier 19.

The size of the heavy particles that are dropped out by the air classifier 19 can be regulated by adjustment of the velocity of air going through the system. The air classifier/solid waste feed subsystem is a completely enclosed system with the result that all odors, dust and potential pollution problems are completely contained.

The heavy non-combustible reject material 26 from the air classifier 19 is carried via a conveyor 27 to a residue storage bin 28 from which it can be disposed of periodically by land fill or ultimately by further reclamation of some or all of the materials contained in the residue.

The light particle fraction of the solid waste which has been carried from the air classifier 19 via conduit 23 to the inertial separator 24 drops preferably into a mulcher 31 which breaks apart any clods, chunks or large pieces that may have passed the shredder 16 or formed after shredding. This mulcher and mulching process eliminate possible clogging in pneumatic feed portions of the rest of the system.

From the mulcher 31 the solid waste drops into a storage accumulator 32 which serves as a reservoir to smooth out the flow of solid waste. From the storage bin 32 the solid waste is carried such as via a conveyor 33 into a hopper 34 for introduction into the entrance of an air-lock feed valve 35.

The air-lock feed valve 35 introduces the solid waste into a fluid conduit 36 where the material is pneumatically conveyed into the fluid bed to be described below.

A bed additive feed system 37 is provided for automatically feeding, upon demand, fresh limestone or other bed additive chemical reactive materials to the fluidized bed during operation. These additives react with the corrosive or other pollutant gases or materials within the bed and reduce or prevent noxious fumes from escaping to the atmosphere.

Where the combustion system also serves to consume liquid waste from a sewage treatment plant 41, sludge from sludge storage tanks 42 is removed via one or more pipes 43 to one or more sludge pumps 44 and via one or more pipes 45 to the combustion chamber where it is injected as a spray on top of the bed of granular material or injected above or below secondary beds in the combustion system.

It has been discovered that with the waste delivery assembly 10 the air volume reducing cyclone inertial separator 24 reduces the volume of air from the air classifier 19 to the air-lock feed valve 35 so that solid waste is fed through valve 35 with minimum turbulence and as dense as possible while the inertial separator 24 and storage bin 32 act as a plenum or reservoir to smooth out the flow of solid waste.

In the combustion assembly 50 a hollow, cylindrical combustion chamber 51 is provided to contain a bed of granular material 52 which, when not being fluidized, is supported on a distributor plate 53 which provides even distribution of air across the bottom of the bed from a plenum chamber 54 therebelow.

Positioned within the combustion housing 51 above the fluid bed are a lower secondary bed/elutriation arrestor 55 and then upper secondary bed/elutriation arrestor 56, each to provide an obstruction of labyrinth construction.

Exhaust gases from the combustion chamber 51 are conveyed out of a number of exhaust ports 59 below a cover over the top of chamber 51 and passed through the gas particle cleanup assembly typically incorporating inertial separators for separation and return of granular material carried out of the bed with the exhaust gases for later return to the bed.

Combustion air is directed to the combustion chamber from a blower 61, through a housing 62, surrounding the inertial separators for heat exchange to heat up the blower air and delivery via a conduit 63 to the plenum 54.

The fluidizing air is caused to flow through the bed material particles under carefully controlled conditions, chief among these conditions being the requirement that the air velocity through the bed, and hence the pressure drop, be greater than the value required to support the bed weight and less than the value required to sweep the particles out of the bed. In addition, the bed must consist of particles within a suitable range of size, shape and density. When these conditions are all satisfied, the stationary bed of particles will have expanded and the bed particles will exist in a fluidized state. If the movement of one specific particle could be observed, it would be seen to undergo a continuous, turbulent motion and would wander throughout the bed in a random manner. Viewed as a whole, the dynamic condition of the fluidized bed resembles a tank of boiling water in the sense that there is considerable turbulence and bursting of bubbles at the surface. It is this dynamic characteristic which imparts to a fluidized bed its unique advantages.

The inert or chemically reactive bed materials used with the fluid bed combustor are chosen to withstand the combustion temperatures without melting or slagging. The specific bed materials selected can fall within a wide variety of inert particles, ranging from the inexpensive silica "beach" sand to the more exotic ceramic materials (usually alumina or silicon carbide) and to chemically reactive materials such as ground limestone, dolomite and others. The bed material is preheated to a predetermined temperature and then fluidized for injection and combustion of the solid waste material.

Figure 3:
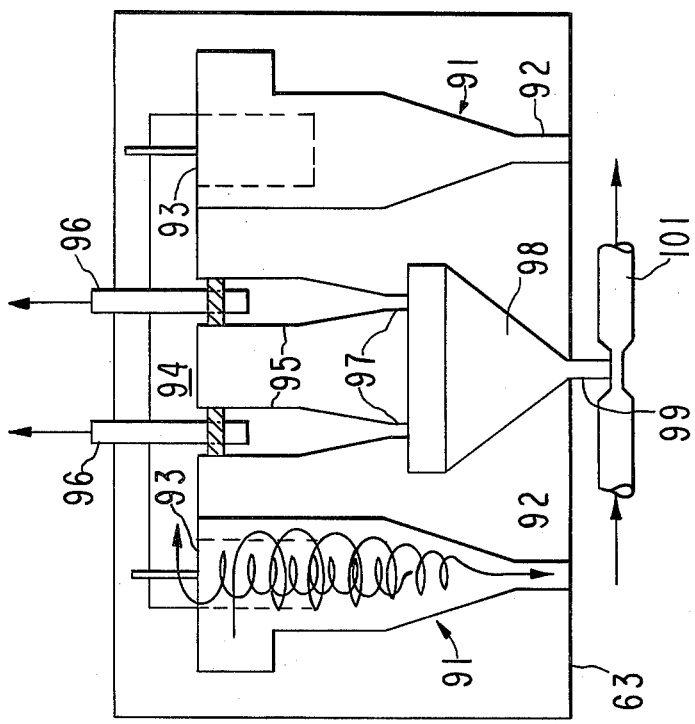
FIG. 3 is a side-elevational view of a portion of the structure shown in FIG. 2.
Figure 2:
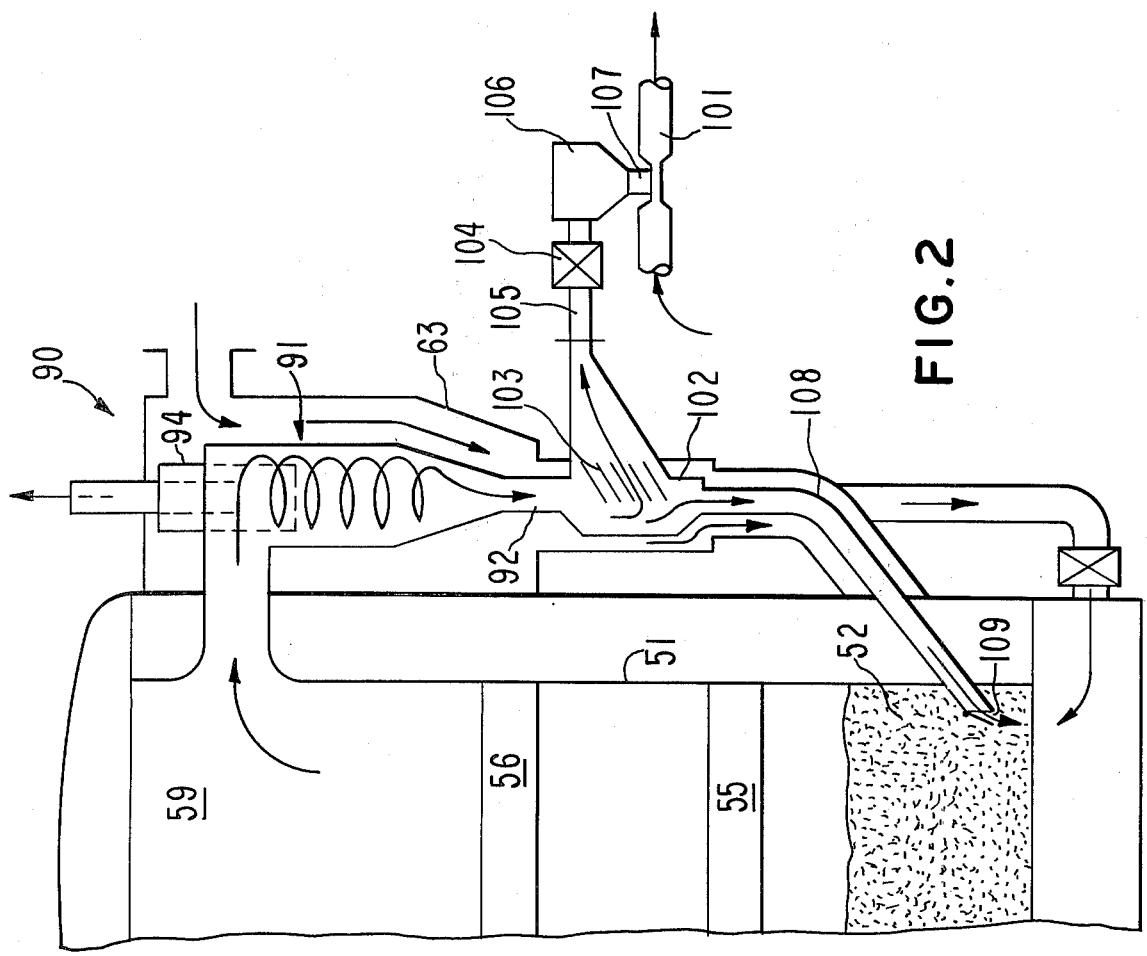
FIG. 2 is a side-elevational schematic view of a portion of the combustion chamber and with the operational elements of the particle collector system schematically illustrated.

The novel cleanup system 90 of the present invention which not only recaptures full-sized bed material for return to the fluid bed but also results in substantially pollution-free exhaust gases is illustrated in greater detail in FIGS. 2 and 3. Referring to these figures, a combustion gas particle cleanup assembly 90 is provided at each of the exhaust ports 59 at the top of the combustion chamber 51. Each particle cleanup assembly 90 includes one or more first stage cyclone inertial separators 91 wherein the particle-laden exhaust gas from the combustion chamber enter tandentially and the heavy particles such as particles of dead material and flyash leave through a lower exit conduit 92 and the exhaust gases leave through an upper exit conduit into a plenum 94 which is the inlet to second stage cyclone inertial separators 95. In the illustrated embodiment showing a pair of second stage inertial separators 95, exhaust stacks 96 are provided for exhausting cleaned gas therefrom to atmosphere. Alternatively, these stacks 96 can be connected to other devices such as turbochargers, steam boilers, additional filters, scrubbers or the like. The flyash removed by the second stage inertial separators 95 leave by exit conduits 97 and are collected in a flyash removal plenum 98 for passage through pipe 99 to a pneumatic eductor 101 to the residue storage bin 28 (see FIG. 1).

Typically, the first stage inertial separators 91 are much larger than the second stage inertial separators 95 and are designed to separate out the larger particles in the exhaust gas stream which are small particles of fluid bed material which are to be returned to the fluid bed. The particle bed material and the flyash removed by the first stage inertial separators are separated from one another in a flyash separator 102 attached to the exit conduit 92 of each first stage inertial separator. The mixture of flyash and bed material cascades over a series of upwardly inclined louvers 103 where a flow of bleed air from the first stage inertial separator 91, controlled by a valve 104 in an exhaust conduit 105, and trains the light flyash and transports it to an accumulator 106 for passage to the residue storage bin 28.

The small-sized particles of bed material pass by the louvers 103 and flow through a conduit 108 and through a flapper valve 109 on the end thereof within the fluid bed 52 in the combustion chamber 51.

The housing 63 surrounds the first and second stage inertial separators 91 and 95, the flyash separator 102 and the conduit 108 for cooling the hot parts of the combustion gas particle cleanup assembly 90 and preheating the combustion air prior to its use for fluidization.

This particle cleanup system 90 results in an increase in system capacity and high combustion freeboard and exhaust velocities. These high velocities entrain not only all the inert flyash but also small particles of the fluid bed material and cause both to exit through the exhaust ports 59. It is desirable to recapture the small-sized bed materials and return them to the fluid bed to insure the proper mix of coarse and fine bed material required for optimum fluidization properties, to prevent loss of fluid bed material, and to provide recirculation of unspent, elutriated chemical bed additive materials that have been injected into the combustion chamber.

What is claimed is:

1. In a waste disposal apparatus for consuming waste with minimal residue and a substantially pollution-free gaseous output including a combustion housing, a bed of granular material, means for supporting the bed of granular material within the housing, and means for providing combustion air to the bottom of the bed for maintaining the granular material in a fluidized state, the improvement comprising:

means for exhausting from the combustion housing combustion air laden with flyash and a certain amount of the granular material, first stage inertial separator means connected to said exhausting means for separating the granular material in the exhaust from the remainder of the exhaust gas, means for returning the granular material separated by said first stage inertial separator to the bed of granular material.

second stage inertial separator means for separating out from said remainder of the exhaust gas from said first stage inertial separator means the remaining particulate material, housing means surrounding said first and second stage inertial separator means, and means for conducting the combustion air from the means for providing combustion air through said housing means to the bottom of the bed for heat exchange with said inertial separator means.

2. In a waste disposal apparatus for consuming waste with minimal residue and a substantially pollution-free gaseous output including a combustion housing, a bed of granular material, means for supporting the bed of granular material within the housing, and means for providing combustion air to the bottom of the bed for maintaining the granular material in a fluidized state, the improvement comprising:

means for exhausting from the combustion housing combustion air laden with flyash and a certain amount of the granular material, first stage inertial separator means connected to said exhausting means for separating the granular material in the exhaust from the remainder of the exhaust gas, means for returning the granular material separated by said first stage inertial separator to the bed of granular material, second stage inertial separator means for separating out from said remainder of the exhaust gas from said first stage inertial separator means the remaining particulate material, and means for separating flyash from granular material in the particle output portion of said first stage inertial separator means before returning the granular material to the bed of granular material.

3. The method of collecting and separating particulate matter in the exhaust of a waste disposal apparatus which includes a combustion housing, a bed of granular material, means for supporting the bed of granular material within the housing and means for providing combustion air to the bottom of the bed for maintaining the granular material in a fluidized state comprising the steps of:

exhausting from the combustion housing combustion air laden with flyash and a certain amount of granular bed material, inertially separating the granular bed material from the remainder of the exhaust gas in a first separation stage, returning the separated granular material to the bed of granular material, inertially separating from the exhaust gas of the first stage inertial separation flyash remaining in the exhaust gas after the first stage of inertial separation, and separating from the granular material separated by the first stage of inertial separation and before returning the granular material to the fluid bed flyash which has been separated from the exhaust gas in the first stage of inertial separation.

4. The method of collecting and separating particulate matter in the exhaust of a waste disposal apparatus which includes a combustion housing, a bed of granular material, means for supporting the bed of granular material within the housing and means for providing combustion air to the bottom of the bed for maintaining the granular material in a fluidized state comprising the steps of:

exhausting from the combustion housing combustion air laden with flyash and a certain amount of granular bed material, inertially separating the granular bed material from the remainder of the exhaust gas in a first separation stage, returning the separated granular material to the bed of granular material, inertially separating from the exhaust gas of the first stage inertial separation flyash remaining in the exhaust gas after the first stage of inertial separation, and exchanging heat from the exhaust gases and separated granular material in the first and second inertial separation stages with combustion air to be directed to the bottom of the bed for maintaining the granular material in a fluidized state thereby preheating the fluidizing combustion air.

* * * * *